US011978419B2

(12) United States Patent
Nojima

(10) Patent No.: US 11,978,419 B2
(45) Date of Patent: May 7, 2024

(54) LIQUID CRYSTAL DISPLAY DEVICE AND METHOD FOR CONTROLLING LIQUID CRYSTAL DISPLAY DEVICE

(71) Applicant: Sharp Display Technology Corporation, Kameyama (JP)

(72) Inventor: Takashi Nojima, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/233,910

(22) Filed: Aug. 15, 2023

(65) Prior Publication Data

US 2024/0087541 A1 Mar. 14, 2024

(30) Foreign Application Priority Data

Sep. 14, 2022 (JP) ................................ 2022-145913

(51) Int. Cl.
*G09G 3/36* (2006.01)

(52) U.S. Cl.
CPC ....... *G09G 3/3648* (2013.01); *G09G 2310/08* (2013.01)

(58) Field of Classification Search
CPC ......................... G09G 3/3648; G09G 2310/08
See application file for complete search history.

(56) References Cited

U.S. PATENT DOCUMENTS

2014/0198093 A1 7/2014 Nambi et al.
2014/0198114 A1 7/2014 Nambi et al.
2014/0198138 A1 7/2014 Nambi et al.
2017/0047027 A1 2/2017 Nambi et al.
2018/0350313 A1 12/2018 Nambi et al.
2019/0266965 A1* 8/2019 Kawashima ............. G09G 3/20
2023/0047265 A1* 2/2023 Ooghe ................. G09G 3/3648
2023/0368736 A1* 11/2023 No ....................... G09G 3/3233

FOREIGN PATENT DOCUMENTS

JP 2016-508239 A 3/2016

* cited by examiner

*Primary Examiner* — Jonathan A Boyd
(74) *Attorney, Agent, or Firm* — ScienBiziP, P.C.

(57) ABSTRACT

A liquid crystal display device includes a liquid crystal display panel including a plurality of gate bus lines, and a control device. The control device includes a first gate driver connected to one end of each of the plurality of gate bus lines and a second gate driver connected to another end of each of the plurality of gate bus lines. The control device receives an image signal, generates a gate signal based on the image signal, and inputs the gate signal to only the first gate driver or to the first gate driver and the second gate driver, in accordance with a refresh rate of the image signal.

8 Claims, 7 Drawing Sheets

LIQUID CRYSTAL DISPLAY DEVICE AND METHOD FOR CONTROLLING LIQUID CRYSTAL DISPLAY DEVICE

CROSS-REFERENCE TO RELATED APPLICATIONS

This application claims the benefit of priority to Japanese Patent Application Number 2022-145913 filed on Sep. 14, 2022. The entire contents of the above-identified application are hereby incorporated by reference.

BACKGROUND

Technical Field

The disclosure relates to a liquid crystal display device and a method for controlling a liquid crystal display device.

There is demand for a liquid crystal display device that can display an image at a high refresh rate in order to improve the display quality of the image, for example, in order to display a moving picture more smoothly. At the same time, there is also demand for a reduction of power consumption in a liquid crystal display device. In particular, in a display device used for a portable device such as a laptop computer, a tablet terminal, or a smartphone, there is demand for improvement, i.e., the reduction of power consumption for lengthening drive time. For example, JP 2016-508239 A discloses a display device that supports a variable refresh rate and can reduce power consumption.

SUMMARY

An object of the disclosure is to provide a liquid crystal display device with low power consumption that supports a high refresh rate and can display an image with a high display quality, and a method for controlling the liquid crystal display device.

A liquid crystal display device according to an embodiment of the disclosure includes a liquid crystal display panel including a plurality of gate bus lines, and a control device. The control device includes a first gate driver connected to one end of each of the plurality of gate bus lines, and a second gate driver connected to another end of each of the plurality of gate bus lines. The control device receives an image signal, generates a gate signal based on the image signal, and inputs the gate signal to only the first gate driver or to the first gate driver and the second gate driver, in accordance with a refresh rate of the image signal.

According to an embodiment of the disclosure, a liquid crystal display device with low power consumption that supports a high refresh rate and can display an image with a high display quality, and a method for controlling the liquid crystal display device are provided.

BRIEF DESCRIPTION OF DRAWINGS

The disclosure will be described with reference to the accompanying drawings, wherein like numbers reference like elements.

DESCRIPTION OF EMBODIMENTS

First Embodiment

Figure 1:
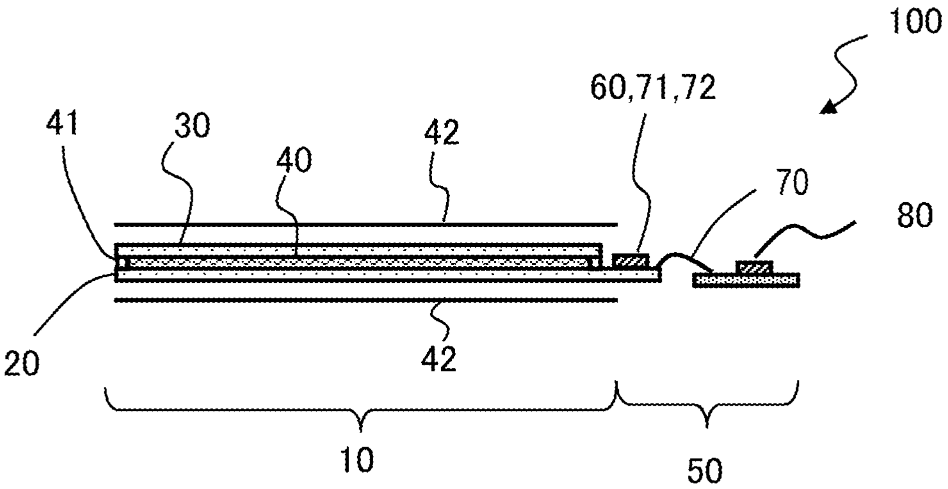
FIG. 1 is a schematic cross-sectional view illustrating a configuration example of a liquid crystal display device according to a first embodiment.

Embodiments of the disclosure will be described below with reference to the drawings. The disclosure is not limited to the following embodiments, and appropriate design changes can be made within a scope that satisfies the configuration of the disclosure. Further, in the description below, the same reference signs may be used in common among the different drawings for the same portions or portions having the same or similar functions, and descriptions of repetitions thereof may be omitted. Further, the configurations described in the embodiments and the modified examples may be combined or modified as appropriate within a range that does not depart from the gist of the disclosure. For ease of explanation, in the drawings referenced below, configurations may be simplified or schematically illustrated, or a portion of the components may be omitted. Further, dimensional ratios between components illustrated in the drawings are not necessarily indicative of actual dimensional ratios.

FIG. 1 is a schematic cross-sectional view illustrating a configuration example of a liquid crystal display device 100 according to a present embodiment. In the present embodiment, the liquid crystal display device 100 includes a liquid crystal display panel 10 and a control device 50. The liquid crystal display panel 10 includes a thin film transistor (TFT) substrate 20, a counter substrate 30, and a liquid crystal layer 40.

The liquid crystal layer 40 is located between the TFT substrate 20 and the counter substrate 30, and is sealed between the TFT substrate 20 and the counter substrate 30 by a seal 41. The liquid crystal display device 100 may further include a pair of polarizers 42. The pair of polarizers 42 are disposed in a crossed-Nicol manner, sandwiching the liquid crystal display panel 10.

The control device 50 includes a source driver 60, a first gate driver 71, a second gate driver 72, and a timing controller 80.

Figure 2:
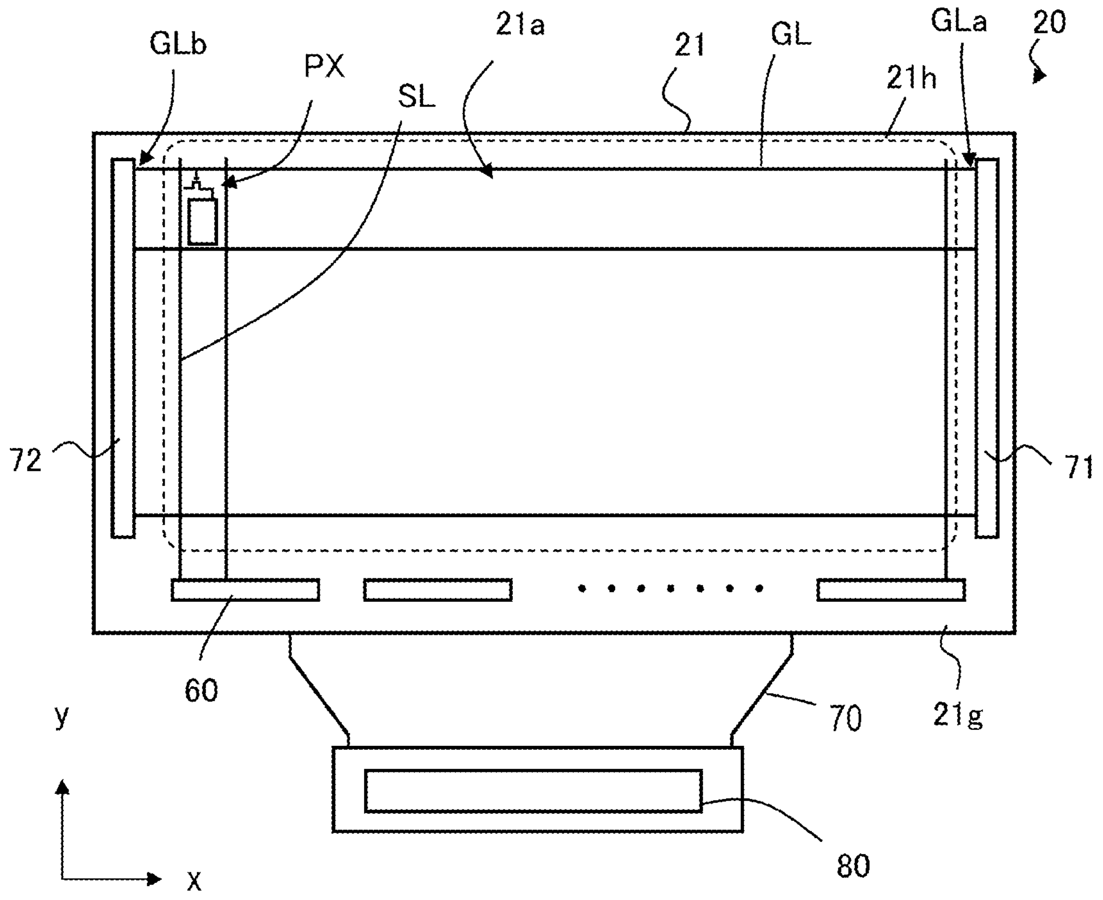
FIG. 2 is a schematic diagram illustrating a configuration of a TFT substrate.

FIG. 2 is a schematic diagram illustrating a configuration of the TFT substrate 20. The TFT substrate 20 includes a substrate 21, a plurality of source bus lines SL, a plurality of gate bus lines GL, and a plurality of pixels PX.

The substrate 21 has a main surface **21*a* including a display region 21*h* and a non-display region 21*g* that is a region other than the display region 21*h*. The plurality of gate bus lines GL, the plurality of source bus lines SL, and the plurality of pixels PX are arranged in the display region 21*h*. Specifically, the plurality of gate bus lines GL each extend in a row direction (x direction) and are arranged at predetermined intervals in a column direction (y direction). The plurality of source bus lines SL each extend in the column direction (y direction) and are arranged at predetermined intervals in the row direction (x direction). The pixel PX is arranged in a region surrounded by a pair of the gate bus lines GL adjacent to each other and a pair of the source bus lines SL adjacent to each other. The plurality of pixels PX are two-dimensionally arrayed in the row direction and the column direction. The source bus lines SL and the gate bus lines GL are extended to the non-display region 21***g*.

Figure 3:
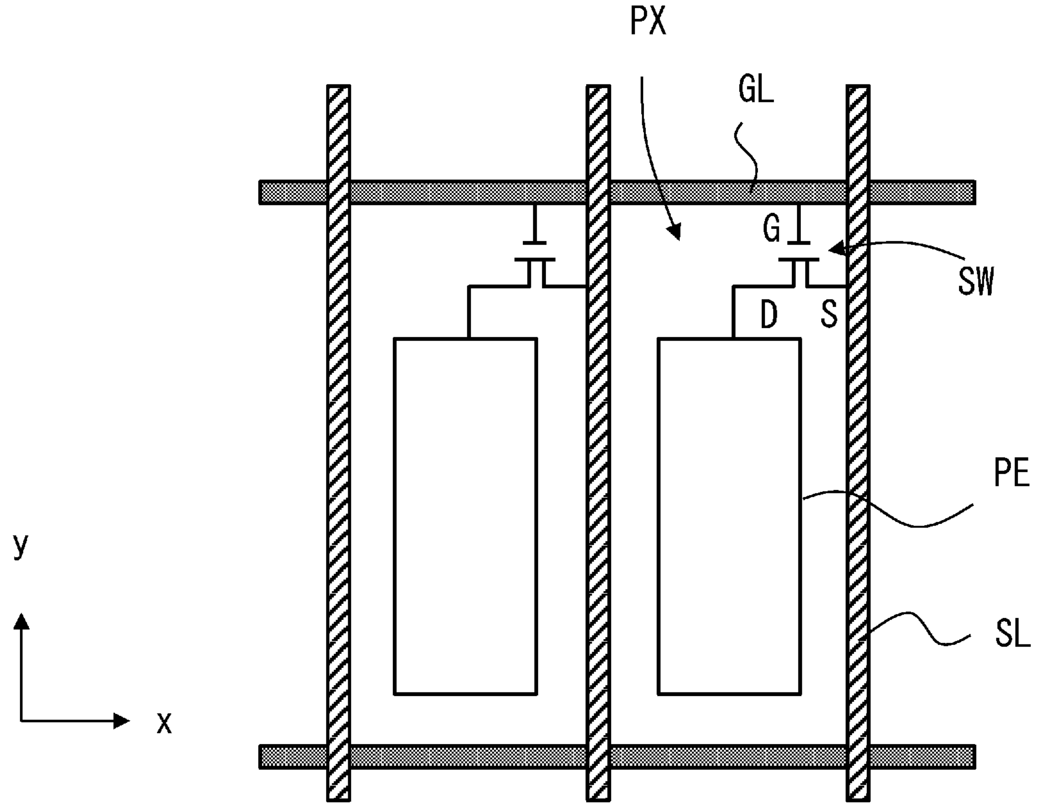
FIG. 3 is an enlarged schematic diagram illustrating a pixel of the TFT substrate.

FIG. 3 is an enlarged schematic diagram illustrating the pixel PX of the TFT substrate 20. Each of the pixels PX includes a pixel electrode PE and a switching element SW. The switching element SW is, for example, a 3-terminal element, and the gate bus line GL, the source bus line SL, and the pixel electrode PE are connected to the three terminals. The switching element SW is, for example, a TFT, and a gate electrode G thereof is connected to the gate bus line GL, a source electrode S thereof is connected to the source bus line SL, and a drain electrode D thereof is connected to the pixel electrode PE.

Each of the gate bus lines GL is connected to the gate electrode G of the TFT of each of the pixels PX arrayed in the row direction, among the plurality of pixels PX. Each of the source bus lines SL is connected to the source electrode S of the TFT of each of the pixels PX arrayed in the column direction, among the plurality of pixels PX.

As illustrated in FIG. 2, the source driver 60, the first gate driver 71, and the second gate driver 72 are arranged in the non-display region 21*g* of the substrate 21. The first gate driver 71 and the second gate driver 72 are connected to both ends of the plurality of gate bus lines GL, respectively, in the non-display region 21*g*. Specifically, one end GLa of the gate bus line GL is connected to the first gate driver 71, and another end GLb of the gate bus line GL is connected to the second gate driver 72.

Further, the source bus lines SL are connected to the source driver 60 in the non-display region 21*g*. The source driver 60, the first gate driver 71, and the second gate driver 72 are connected to the timing controller 80 via a flexible printed circuit (FPC) 70.

Note that, in FIG. 2, although each of the first gate driver 71 and the second gate driver 72 is illustrated as a single integrated circuit (IC), each of the first gate driver 71 and the second gate driver 72 may be constituted by a plurality of ICs. Further, although the source driver 60 is illustrated as a plurality of ICs, the source driver 60 may be constituted by a single IC.

The source driver 60, the first gate driver 71, and the second gate driver 72 are package components covered by resin or the like, or bare chips, and may be mounted in the non-display region 21*g* of the substrate 21 of the TFT substrate 20. Alternatively, the source driver 60, the first gate driver 71, and the second gate driver 72 may be monolithic drivers constituted by a plurality of TFTs or the like formed in the non-display region 21*g* of the substrate 21.

Figure 4:
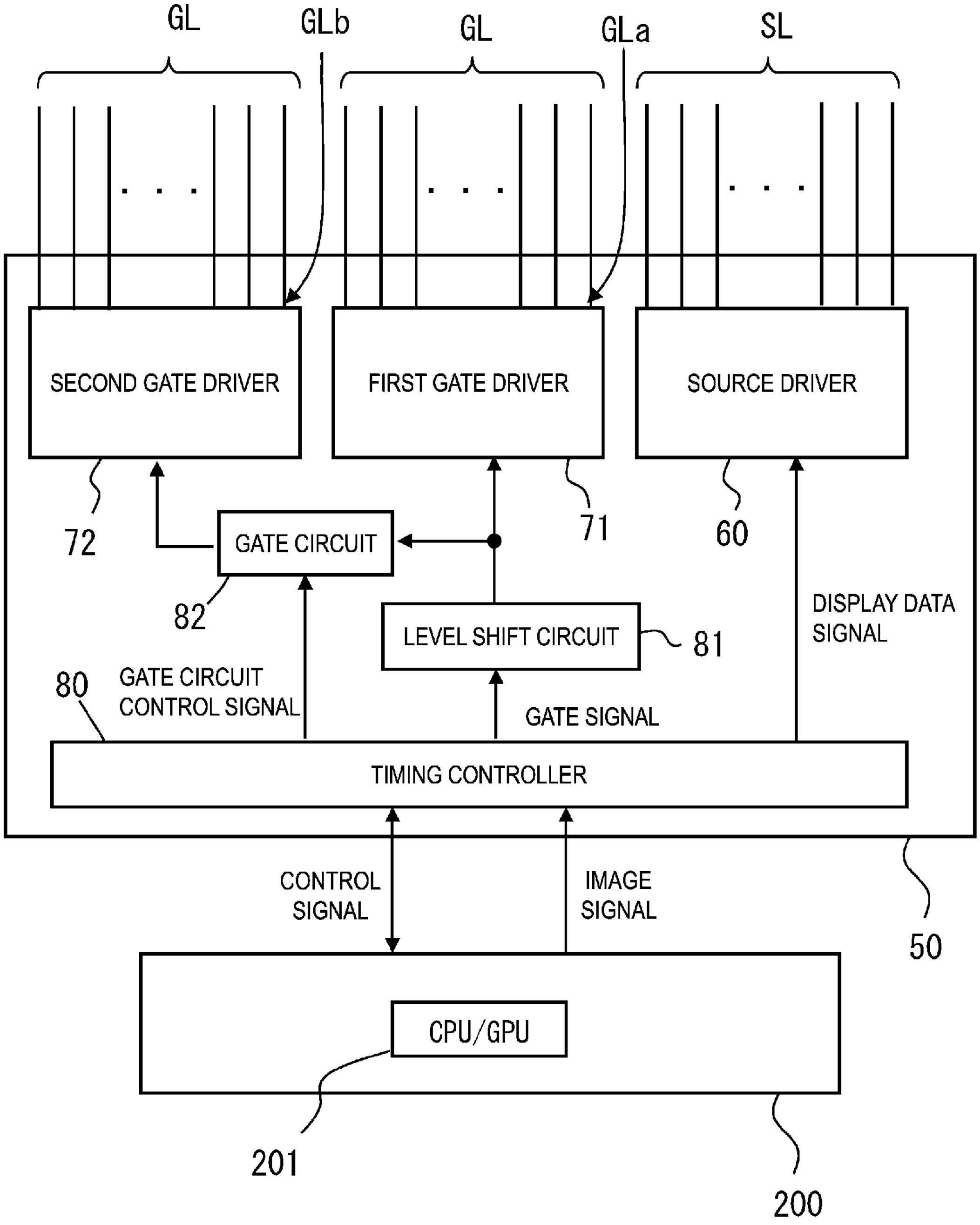
FIG. 4 is a block diagram illustrating a configuration example of a control device.

FIG. 4 is a block diagram illustrating a schematic configuration of the control device 50. The control device 50 receives an image signal from a host device 200 in which the liquid crystal display device 100 is mounted and which includes an arithmetic unit 201 such as a central processing unit (CPU) or a graphics processing unit (GPU), and drives the gate bus lines GL and the source bus lines SL of the liquid crystal display panel 10. The liquid crystal display device 100 according to the disclosure supports at least two different refresh rates, and can display an image at the two different refresh rates. For example, the liquid crystal display device 100 supports refresh rates of 30 Hz and 240 Hz with the progressive scan.

The control device 50 includes the timing controller 80, a level shift circuit 81, and a gate circuit 82 as well as the source driver 60, the first gate driver 71, and the second gate driver 72 described above.

The timing controller 80 receives the image signal and a control signal from the host device 200. The control signal includes information relating to the refresh rate of the image signal. For example, the timing controller 80 receives information relating to a refresh rate according to an extended display identification data (EDID) format. The host device 200 can generate the image signal so that the image can be displayed at the above-described at least two different refresh rates. In addition, the host device 200 generates information relating to the refresh rate of the generated image signal.

The timing controller 80 includes a memory, and stores information relating to the refresh rate received from the host device 200. In addition, the timing controller 80 generates a gate signal and a display data signal based on the image signal received from the host device 200.

The timing controller 80 further inputs the gate signal to the first gate driver 71, or to the first gate driver 71 and the second gate driver 72 in accordance with the refresh rate. More specifically, the timing controller 80 inputs the gate signal only to the first gate driver 71 when the refresh rate stored in the memory is less than a predetermined value, and inputs the gate signal to the first gate driver 71 and the second gate driver 72 when the refresh rate is equal to or greater than the predetermined value. For this reason, the timing controller 80 generates a gate circuit control signal when the refresh rate is equal to or greater than the predetermined value. For example, the timing controller 80 generates the gate circuit control signal when the refresh rate is equal to or greater than 120 Hz.

The display data signal generated by the timing controller 80 is input to the source driver 60. The source driver 60 is connected to the source bus lines SL as described above, and outputs the received display data signal to the source bus lines SL.

On the other hand, the gate signal is input to the first gate driver 71 and the gate circuit 82 via the level shift circuit 81 that adjusts the high level.

The gate circuit 82 is, for example, an AND circuit, and receives the gate circuit control signal from the timing controller 80. Since the AND condition is satisfied only when the gate circuit 82 receives the gate circuit control signal, the gate circuit 82 outputs the gate signal to the second gate driver 72.

In other words, in a period during which the gate circuit control signal is being generated, the gate signal is output from the first gate driver 71 and the second gate driver 72, and in a period during which the gate circuit control signal is not being generated, the gate signal is not output from the second gate driver 72, and the gate signal is output only from the first gate driver 71.

As described above, the one end GLa of the gate bus line GL is connected to the first gate driver 71, and the other end GLb is connected to the second gate driver 72. Thus, the control device 50 inputs the gate signal to one side or both sides of the gate bus line GL depending on whether or not the gate circuit control signal is generated, that is, in accordance with the refresh rate of the image signal. In particular, when the refresh rate is high, the gate signal is input from both sides of the gate bus line GL.

When operating the liquid crystal display device 100, an operator first selects one of the refresh rates supported by the host device 200, and inputs the selected refresh rate to the host device 200. The host device 200 generates the image signal conforming to the input refresh rate, and outputs the image signal to the control device 50. Further, the host device 200 outputs the control signal including the input refresh rate to the control device 50.

The timing controller 80 of the control device 50 stores the refresh rate included in the control signal, and generates the gate circuit control signal in accordance with the refresh rate. For example, when the refresh rate is 30 Hz, the gate circuit control signal is not generated, and when the refresh rate is 240 Hz, the gate circuit control signal is generated. In this manner, the control device 50 inputs the gate signal only to the first gate driver 71 when the refresh rate of the image signal is less than the predetermined value, for example, when the refresh rate is 30 Hz, and inputs the gate signal to the first gate driver 71 and the second gate driver 72 when the refresh rate is equal to or greater than the predetermined value, for example, when the refresh rate is 240 Hz.

According to the liquid crystal display device 100 of the present embodiment, by adopting the above-described configuration, it is possible to support a high refresh rate and display an image with a high display quality. In addition, power consumption can be reduced when the image is displayed at a low refresh rate. The reasons for this will be described.

Figure 5:
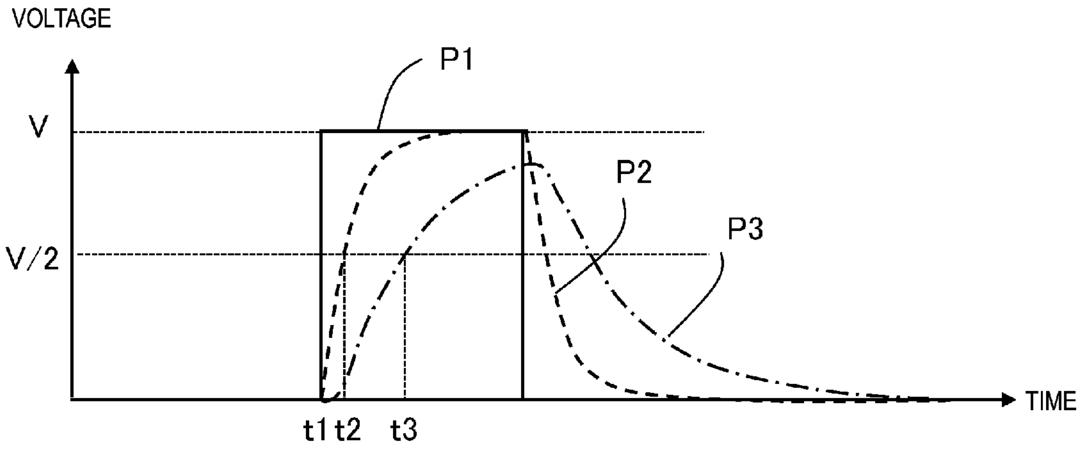
FIG. 5 is a schematic diagram describing waveforms of a gate signal.

FIG. 5 shows waveforms of the gate signal observed at three positions on one of the gate bus lines, in a case where a pulsed gate signal is applied from a gate driver to the gate bus line in a liquid crystal display device in which the gate driver is connected to one end of the gate bus line. A solid line indicates a waveform P1 observed at a position closest to the gate driver on the gate bus line, a broken line indicates a waveform P2 observed at an intermediate position of the gate bus line, and an alternate long and short dash line indicates a waveform P3 observed at an end portion, of the gate bus line, on the opposite side from the one end of the gate bus line to which the gate driver is connected.

As shown by the waveform P1 in FIG. 5, the pulse shape of the gate signal is maintained at a position close to the gate driver, but as the distance from the gate driver increases, the waveform becomes more rounded as shown by the waveforms P2 and P3. Further, a delay occurs in the gate signal. It is considered that this delay occurs due to a distributed constant circuit, which is constituted by the resistor of the gate bus line and the capacitance of the pixel connected to the gate bus line, and the like.

Thus, for example, if it is assumed that the TFT is turned on at timing when half the voltage of the gate signal is applied to the TFT of the pixel, the TFT is turned on at time t1, t2, and t3 for the waveforms P1, P2, and P3, respectively. In other words, on one of the gate lines, timing at which the pixel is turned on is further delayed as the distance from the gate driver increases.

The delay in the timing at which the pixel is turned on causes a deterioration in the display quality, particularly when the image is displayed at a high refresh rate and one frame period is short. Thus, in the liquid crystal display device of the present embodiment, when the refresh rate is high, the gate signal is input from both sides of the gate bus line GL using the first gate driver 71 and the second gate driver 72. As a result, the delay in the gate signal is suppressed, and the display quality of the image is improved.

On the other hand, when the image is displayed at a low refresh rate, a period during which the same image is displayed is relatively long. Accordingly, even if the timing at which the pixel is turned on is slightly delayed, the impact on the display quality is small. Thus, by using the first gate driver 71 and causing the second gate driver 72 to stop operating, the gate signal is input only from one side of the gate bus line GL. As a result, the power consumption when using the low refresh rate is reduced.

As described above, according to the liquid crystal display device of the present embodiment, since the number of gate drivers to be used is changed in accordance with the refresh rate, the power consumption can be reduced while suppressing the deterioration in the display quality caused by the delay in the gate signal.

Second Embodiment

Figure 6:
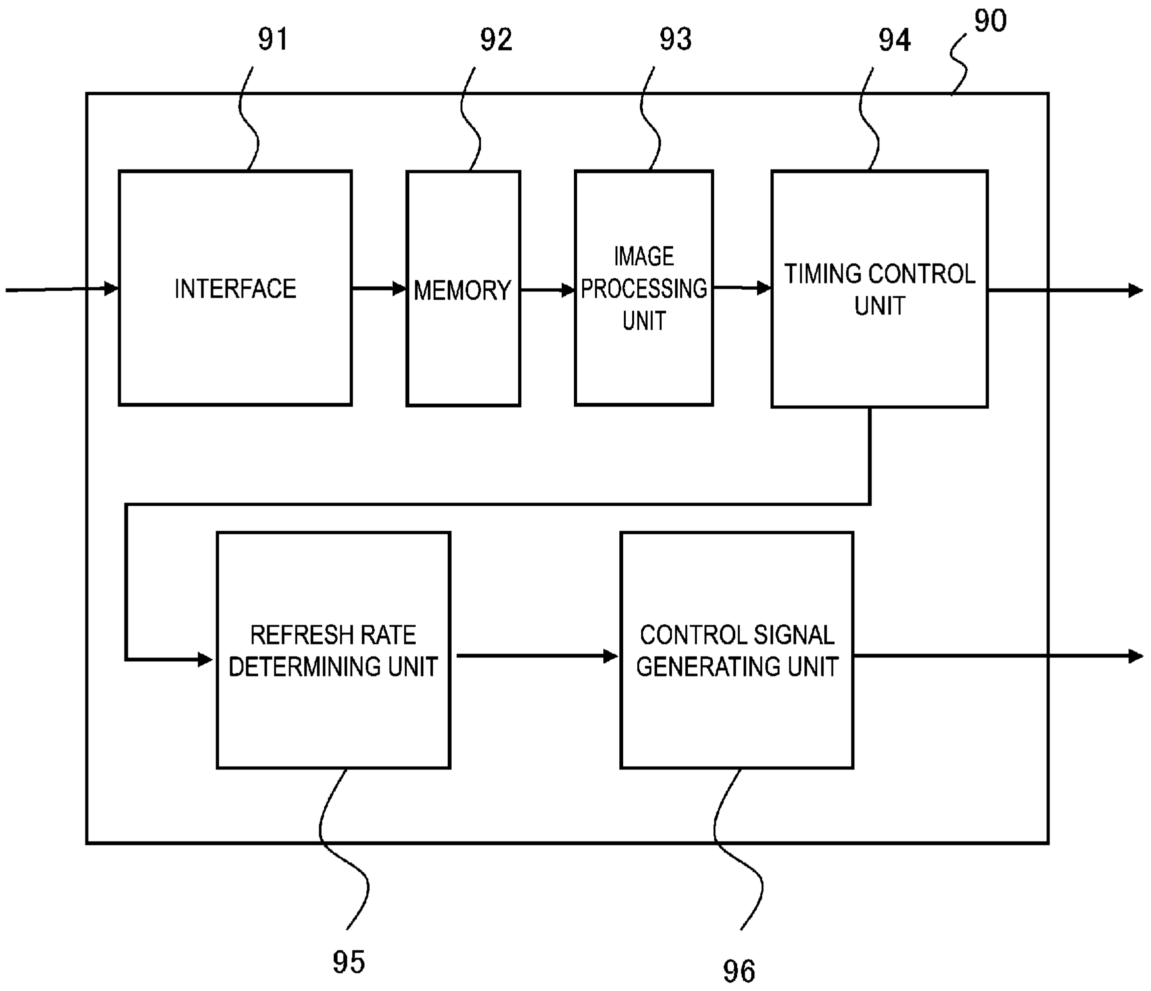
FIG. 6 is a block diagram illustrating a configuration example of a timing controller of a liquid crystal display device according to a second embodiment.

FIG. 6 is a block diagram illustrating a configuration example of a timing controller 90 of a liquid crystal display device according to the present embodiment. The liquid crystal display device of the present embodiment is different from the liquid crystal display device of the first embodiment in that the liquid crystal display device of the present embodiment supports a variable refresh rate (VRR). The timing controller 90 includes, for example, an interface 91, a memory 92, an image processing unit 93, a timing control unit 94, a refresh rate determining unit 95, and a control signal generating unit 96. The timing controller 90 as a whole conforms to the embedded display port (eDP) standard, for example.

The interface 91 receives an image signal, acquires signals such as red-green-blue (RGB) data of each of the pixels and various clock signals, and outputs the signals to the memory 92. The memory 92 stores the RGB data for panel self-refresh and the like. The image processing unit 93 performs processing such as color management or gamma correction on the RGB data. The timing control unit 94 generates, from the various clock signals, clock signals for driving the source bus lines SL and the gate bus lines GL. Specifically, the timing control unit 94 generates a source start pulse signal SSP, a source clock signal SCK, a gate start pulse signal GSP, a gate clock signal GCK, and the like.

Figure 7:
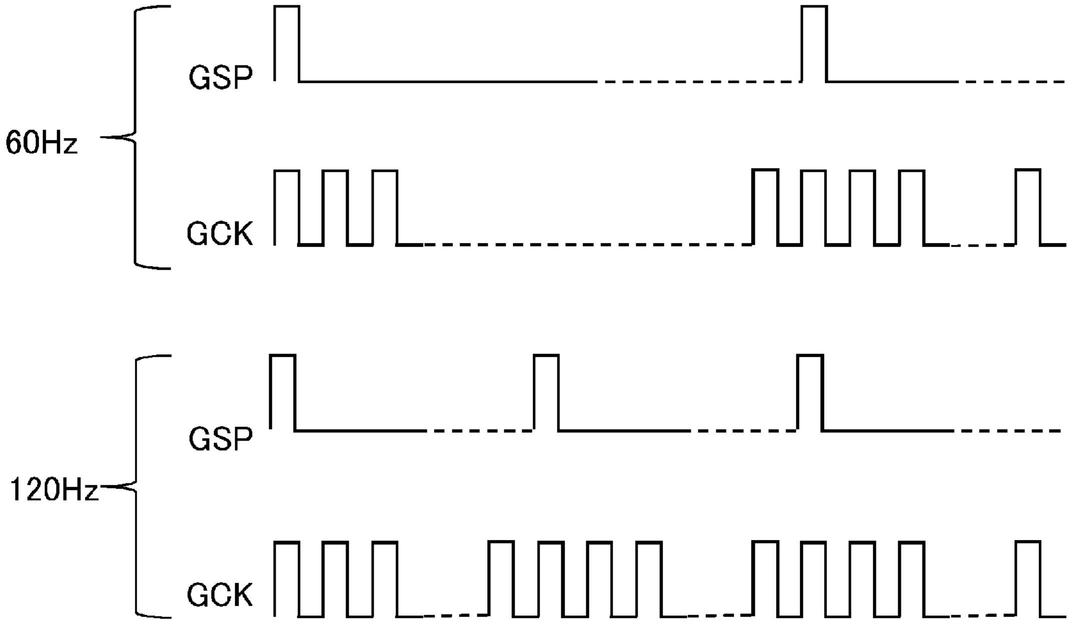
FIG. 7 is a schematic view describing a method for measuring a refresh rate.

The refresh rate determining unit 95 determines the refresh rate of the image signal. For example, the refresh rate determining unit 95 receives the gate start pulse signal GSP and the gate clock signal GCK, and determines the refresh rate by counting the number of pulses of the gate clock signal GCK using the gate start pulse signal GSP as a trigger. For example, FIG. 7 illustrates examples of two refresh rates having different intervals between the gate start pulse signals GSP. The example illustrated in the upper part of the drawing is for 60 Hz and the example illustrated in the lower part of the drawing is for 120 Hz.

The control signal generating unit 96 receives the determined refresh rate, and generates the gate circuit control signal when the refresh rate is equal to or greater than a predetermined value. For example, when the predetermined value is 60 Hz and the refresh rate is 30 Hz, the control signal generating unit 96 does not generate the gate circuit control signal, and when the refresh rate is equal to or greater than 60 Hz, the control signal generating unit 96 generates the gate circuit control signal.

As described in the first embodiment with reference to FIG. 4, the gate circuit 82 outputs the gate signal to the second gate driver 72 in the period during which the gate circuit 82 receives the gate circuit control signal.

According to the liquid crystal display device of the present embodiment, when the timing controller 90 determines the refresh rate and displays an image at a high refresh rate, the first gate driver 71 and the second gate driver 72 are used to input the gate signal from both sides of the gate bus line GL. As a result, the delay in the gate signal is suppressed, and the display quality of the image is improved.

Further, when the image is displayed at a low refresh rate, the gate signal is input only from one side of the gate bus line GL by using the first gate driver 71 and causing the second gate driver 72 to stop operating. As a result, the power consumption when using the low refresh rate can be reduced. By dynamically changing the number of gate drivers to be operated, the power consumption can be reduced more appropriately, while improving the display quality of the image.

Various modifications can be made to the liquid crystal display device and the method for controlling the liquid crystal display device according to the present embodiment. For example, the configuration for detecting the refresh rate is not limited to the above-described embodiment, and other control signals or the like may be used. Further, the structure and driving method of the liquid crystal display panel 10 are not limited, and liquid crystal display panels having various structures and driven by various driving methods can be used in the liquid crystal display device and the method for controlling the liquid crystal display device according to the present embodiment.

A liquid crystal display device and a method for controlling a liquid crystal display device according to the disclosure can be explained as follows.

A liquid crystal display device according to a first configuration includes a liquid crystal display panel including a plurality of gate bus lines, and a control device. The control device receives an image signal, generates a gate signal based on the image signal, and inputs the gate signal to the plurality of gate bus lines from one side or from both sides of the plurality of gate bus lines, in accordance with a refresh rate of the image signal. Specifically, the control device may include a first gate driver connected to one end of each of the plurality of gate bus lines, and a second gate driver connected to another end of each of the plurality of gate bus lines, and may input the gate signal to the first gate driver or to the first gate driver and the second gate driver, in accordance with the refresh rate of the image signal.

According to the first configuration, since the number of gate drivers to be used can be changed in accordance with the refresh rate, power consumption can be reduced while suppressing a deterioration in display quality caused by a delay in the gate signal.

In a liquid crystal display device according to a second configuration, in the first configuration, the control device may further include a timing controller configured to generate the gate signal from the image signal. The timing controller may support at least two different refresh rates, and may input the gate signal to the first gate driver or to the first gate driver and the second gate driver, in accordance with the refresh rate.

In a liquid crystal display device according to a third configuration, in the second configuration, the timing controller may input the gate signal to the first gate driver when the refresh rate is less than a predetermined value, and may input the gate signal to the first gate driver and the second gate driver when the refresh rate is equal to or greater than the predetermined value.

In a liquid crystal display device according to a fourth configuration, in the third configuration, the control device may further include a gate circuit, and the timing controller may further generate a gate circuit control signal when the refresh rate is equal to or greater than the predetermined value. The timing controller may input the gate signal to the first gate driver and the gate circuit, and the gate circuit may output the gate signal to the second gate driver when the gate circuit receives the gate circuit control signal.

In a liquid crystal display device according to a fifth configuration, in any one of the second to fourth configurations, the timing controller may receive, from outside, a signal specifying the refresh rate.

In a liquid crystal display device according to a sixth configuration, in any one of the second to fourth configurations, the timing controller may generate, from the image signal, a gate clock signal and a gate start pulse signal, and may determine the refresh rate from the gate clock signal and the gate start pulse signal.

In a liquid crystal display device according to a seventh configuration, in any one of the first to fifth configurations, the liquid crystal display panel may include a plurality of pixels, the plurality of pixels each including a thin film transistor (TFT), the plurality of pixels arrayed two-dimensionally in a row direction and a column direction, and each of the plurality of gate bus lines may connect, to each other, respective gate electrodes of the TFTs of pixels arrayed in the row direction, among the plurality of pixels.

A method for controlling a liquid crystal display device according to an eighth configuration is a method for controlling a liquid crystal display device provided with a liquid crystal display panel including a plurality of gate bus lines, and with a control device. The method includes causing the control device to receive an image signal, generate a gate signal based on the image signal, and input the gate signal to the plurality of gate bus lines from one side or from both sides of the plurality of gate bus lines, in accordance with a refresh rate of the image signal.

According to the eighth configuration, since the number of gate drivers to be used can be changed in accordance with the refresh rate, power consumption can be reduced while suppressing a deterioration in display quality caused by a delay in the gate signal.

INDUSTRIAL APPLICABILITY

A liquid crystal display device and a method for controlling the liquid crystal display device according to the disclosure are favorably used as a liquid crystal display device that supports at least two refresh rates or conforms to a variable refresh rate, and as a method for controlling the liquid crystal display device, respectively.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:

a liquid crystal display panel including a plurality of gate bus lines; and a control device, wherein the control device includes a first gate driver connected to one end of each of the plurality of gate bus lines, and a second gate driver connected to another end of each of the plurality of gate bus lines, and the control device receives an image signal, generates a gate signal based on the image signal, and inputs the gate signal to only the first gate driver or to the first gate driver and the second gate driver, in accordance with a refresh rate of the image signal.

2. The liquid crystal display device according to claim 1, wherein the control device further includes a timing controller configured to generate the gate signal from the image signal, and the timing controller supports at least two different refresh rates, and inputs the gate signal to the first gate driver or to the first gate driver and the second gate driver, in accordance with the refresh rate.

3. The liquid crystal display device according to claim 2, wherein the timing controller inputs the gate signal to the first gate driver when the refresh rate is less than a predetermined value, and inputs the gate signal to the first gate driver and the second gate driver when the refresh rate is equal to or greater than the predetermined value.

4. The liquid crystal display device according to claim 3, wherein the control device further includes a gate circuit, the timing controller further generates a gate circuit control signal when the refresh rate is equal to or greater than the predetermined value, the timing controller inputs the gate signal to the first gate driver and the gate circuit, and the gate circuit outputs the gate signal to the second gate driver when the gate circuit receives the gate circuit control signal.

5. The liquid crystal display device according to claim 2, wherein the timing controller receives, from outside, a signal specifying the refresh rate.

6. The liquid crystal display device according to claim 2, wherein the timing controller generates, from the image signal, a gate clock signal and a gate start pulse signal, and determines the refresh rate from the gate clock signal and the gate start pulse signal.

7. The liquid crystal display device according to claim 1, wherein the liquid crystal display panel includes a plurality of pixels, the plurality of pixels each including a thin film transistor (TFT), the plurality of pixels arrayed two-dimensionally in a row direction and a column direction, and each of the plurality of gate bus lines connects, to each other, respective gate electrodes of the TFTs of pixels arrayed in the row direction, among the plurality of pixels.

8. A method for controlling a liquid crystal display device provided with a liquid crystal display panel including a plurality of gate bus lines, and with a control device, the method comprising causing the control device to:

receive an image signal;

generate a gate signal based on the image signal; and input the gate signal to the plurality of gate bus lines from one side or from both sides of the plurality of gate bus lines, in accordance with a refresh rate of the image signal.

* * * * *